(12) United States Patent
Baboescu et al.

(10) Patent No.: US 10,555,179 B2
(45) Date of Patent: Feb. 4, 2020

(54) CELLULAR-WIRELESS LOCAL AREA NETWORK (WLAN) COEXISTENCE

(71) Applicant: AVAGO TECHNOLOGIES GENERAL IP (SINGAPORE) PTE. LTD., Singapore (SG)

(72) Inventors: Florin Baboescu, Solana Beach, CA (US); Thomas Derham, La Jolla, CA (US); Vinko Erceg, Cardiff, CA (US); Yong Li, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 217 days.

(21) Appl. No.: 15/611,518

(22) Filed: Jun. 1, 2017

(65) Prior Publication Data
US 2017/0353867 A1 Dec. 7, 2017

Related U.S. Application Data

(60) Provisional application No. 62/344,941, filed on Jun. 2, 2016.

(51) Int. Cl.
| | |
|---|---|
| *H04W 16/14* | (2009.01) |
| *H04L 27/26* | (2006.01) |
| *H04W 24/02* | (2009.01) |
| *H04W 76/10* | (2018.01) |
| *H04W 88/06* | (2009.01) |
| *H04L 5/00* | (2006.01) |
| *H04L 27/00* | (2006.01) |

(52) U.S. Cl.
CPC ......... *H04W 16/14* (2013.01); *H04L 27/2614* (2013.01); *H04W 24/02* (2013.01); *H04W 76/10* (2018.02); *H04L 5/0082* (2013.01); *H04L 27/0008* (2013.01); *H04W 88/06* (2013.01)

(58) Field of Classification Search
CPC ..... H04W 16/14; H04W 76/10; H04W 24/02; H04W 84/18; H04W 84/12
See application file for complete search history.

(56) References Cited

U.S. PATENT DOCUMENTS

2007/0286143 A1* 12/2007 Olson ................. H04L 63/1433
370/338
2013/0272260 A1* 10/2013 Bitran ................... H04W 76/10
370/329

(Continued)

OTHER PUBLICATIONS

Slovakia, 3GPP TSG-RAN WG2 Meeting #89bis, "LTE-WLAN interworking enhancement", Apr. 20-24, 2015. (Year: 2015).*

*Primary Examiner* — Lan-Huong Truong
(74) *Attorney, Agent, or Firm* — Morgan, Lewis & Bockius LLP

(57) ABSTRACT

A wireless device includes a first modem circuit, a second modem circuit, and one or more processor circuits. The first modem circuit supports wireless local area network (WLAN) communications. The second modem circuit supports long term evolution (LTE) and licensed assisted access (LAA) communications. The processor circuits determine free time intervals during which the second modem circuit is not engaged with a medium. The wireless device provides measurement reports to a base station. The first modem circuit enables the wireless device to perform the WLAN communications using the free time intervals without signaling to the base station.

20 Claims, 6 Drawing Sheets

(56) References Cited

U.S. PATENT DOCUMENTS

| | | | |
|---|---|---|---|
| 2016/0157293 A1* | 6/2016 | Pazhyannur | H04W 76/27 |
| | | | 370/329 |
| 2016/0227416 A1* | 8/2016 | Suzuki | H04W 72/0453 |
| 2016/0337904 A1* | 11/2016 | Hsu | H04W 28/12 |
| 2016/0345345 A1* | 11/2016 | Malik | H04W 48/04 |
| 2017/0311169 A1* | 10/2017 | Cai | H04W 16/14 |

* cited by examiner

CELLULAR-WIRELESS LOCAL AREA NETWORK (WLAN) COEXISTENCE

CROSS-REFERENCE TO RELATED APPLICATIONS

This application claims the benefit of priority under 35 U.S.C. § 119 from U.S. Provisional Patent Application 62/344,941 filed Jun. 2, 2016, which is incorporated herein by reference in its entirety.

TECHNICAL FIELD

The present description relates generally to wireless communications, and more particularly, to cellular-wireless local area network (WLAN) coexistence.

BACKGROUND

Cellular-WLAN coexistence allows a device to support both cellular communication and WLAN communication. In some cases, the cellular and WLAN communication may occur simultaneously, e.g. in conjunction with one another. Such coexistence may improve quality of service of a user device, user device coverage, and/or reduce battery power consumption, such as by reducing or avoiding a performance impact from collisions that may occur between cellular and WLAN communication. In third generation partnership project (3GPP) release 13, features known as long-term evolution (LTE) wireless local area network (WLAN) aggregation (LWA) and LTE WLAN radio level integration with IPsec tunnel (LWIP) are specified. The LWA feature allows aggregation of transmissions over licensed and unlicensed spectra between a base station such as an eNodeB (eNB) and a given terminal device (e.g., a user equipment (UE) or a station (STA)) using LTE and WLAN (e.g., 802.11) radio interfaces. The unlicensed spectra includes, for example, the 2.4 GHz industrial, scientific, and medical radio (ISM) band and the 5 GHz unlicensed national information infrastructure (UNIT) band. The aggregation can be performed at the radio layer in a way that can take advantage of radio layer information such as signal quality metrics.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects of the subject technology, a communication system and devices are described that support cellular-wireless local area network (WLAN) coexistence. The subject technology uses long-term evolution (LTE) wireless local area network (WLAN) aggregation (LWA) measurement reports for licensed assisted access (LAA). In some aspects, the subject disclosure uses WLAN signaling to provide time-division-multiplexing (TDM) information to a WLAN modem of a terminal (e.g., a wireless device such as a user device). The subject technology enables a user device to perform WLAN communications during determined free time intervals without signaling to the base station.

Figure 1:
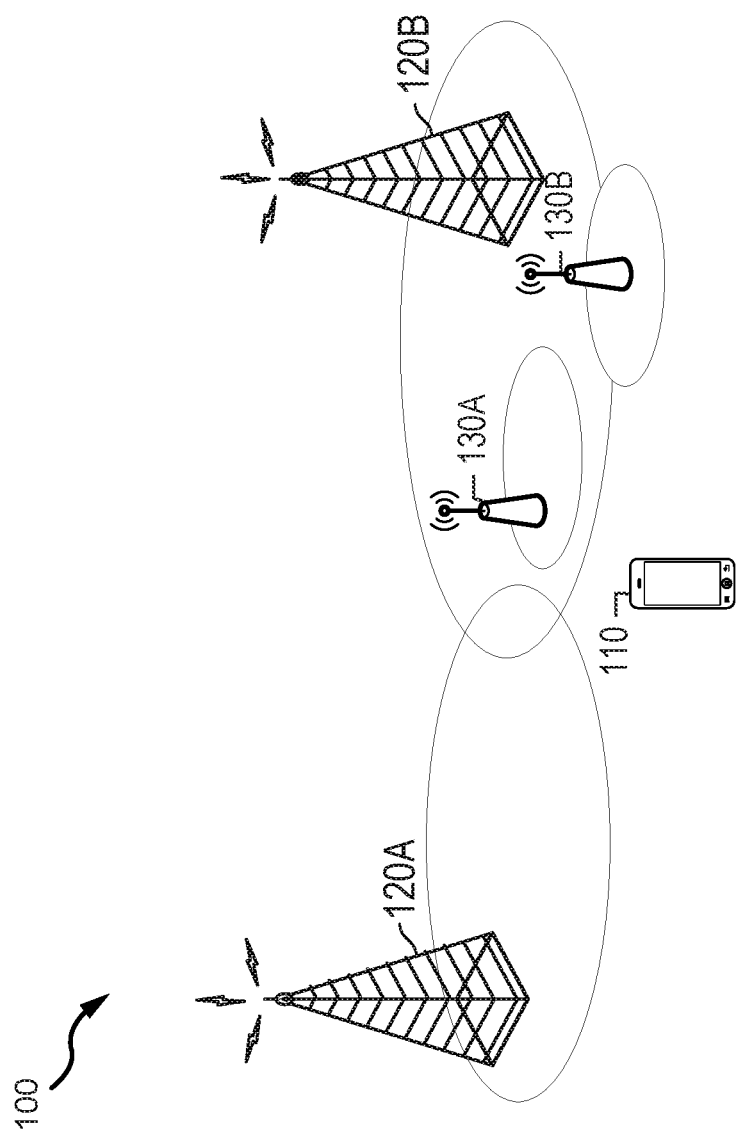
FIG. 1 illustrates an example network environment in which cellular-wireless local area network (WLAN) coexistence may be implemented in accordance with one or more implementations.

FIG. 1 illustrates an example network environment 100 in which cellular-WLAN coexistence may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a user device 110, base stations 120A-B, and access points 130A-B. The user device 110 may include, may be a component of, and/or may be referred to as, a User Equipment (UE), station (STA), or terminal device. The user device 110 includes suitable logic, circuitry, interfaces, memory, and/or code that enables communications, e.g., with one or more of the base stations 120A-B and/or one or more of the access points 130A-B, via wireless interfaces and utilizing one or more radio transceivers. The user device 110 may also be operable to communicate wirelessly with one or more other user devices, one or more other base stations, and/or one or more other access points not shown in FIG. 1.

The user device 110 may be, and/or may include, a mobile phone, a personal digital assistant (PDA), a tablet device, a computer, or generally any device that is operable to communicate wirelessly with one or more of the base stations 120A-B and/or one or more of the access points 130A-B. The user device 110 may be, and/or may include one or more components of, the system discussed below with respect to FIG. 2.

One or more of the base stations 120A-B may include, may be a component of, and/or may be referred to as, a cell, a node B (NB), an evolved universal mobile telecommunications system (UMTS) terrestrial radio access network (E-UTRAN) node B, an evolved nodeB (eNodeB or eNB), a master eNodeB (MeNB), or a home eNB (HeNB). One or more of the base stations 120A-B may be a small (S) cell, such as a low-power base station (e.g., an eNB, a HeNB or a relay node (RN) or remote radio head (RRH) to an existing macro-eNB). One or more of the base stations 120A-B includes suitable logic, circuitry, interfaces, memory, and/or code that enable communications, e.g., with the user device 110 and/or one of the other base stations 120A-B, via wireless interfaces and utilize one or more radio transceivers. One or more of the base stations 120A-B is also operable to communicate wirelessly with one or more other user devices and/or one or more other base stations not shown in FIG. 1. In one or more implementations, one or more of the base stations 120A-B is a base station of a cellular-based wireless network, such as a long term evolution (LTE) communications network, global system for mobile (GSM) communications network, UMTS communications network, or generally any cellular-based communications network. In some cases, the base stations 120A-B may utilize an unlicensed spectrum in a carrier aggregation procedure, such as in licensed assisted access (LAA) communication. One or more of the base stations 120A-B may be, and/or may include one or more components of, the system discussed below with respect to FIG. 2.

One or more of the access points 130A-B may include, may be a component of, and/or may be referred to as, a WLAN access point. One or more of the access points 130A-B includes suitable logic, circuitry, interfaces, memory, and/or code that enable communications, e.g., with the user device 110 and/or one of the other WLAN access points 130A-B, via wireless interfaces and utilize one or more radio transceivers. One or more of the WLAN access points 130A-B is also operable to communicate wirelessly with one or more other user devices and/or one or more other access points not shown in FIG. 1. One or more of the WLAN access points 130A-B may be, and/or may include one or more components of, a communication system discussed below with respect to FIG. 2.

Figure 2:
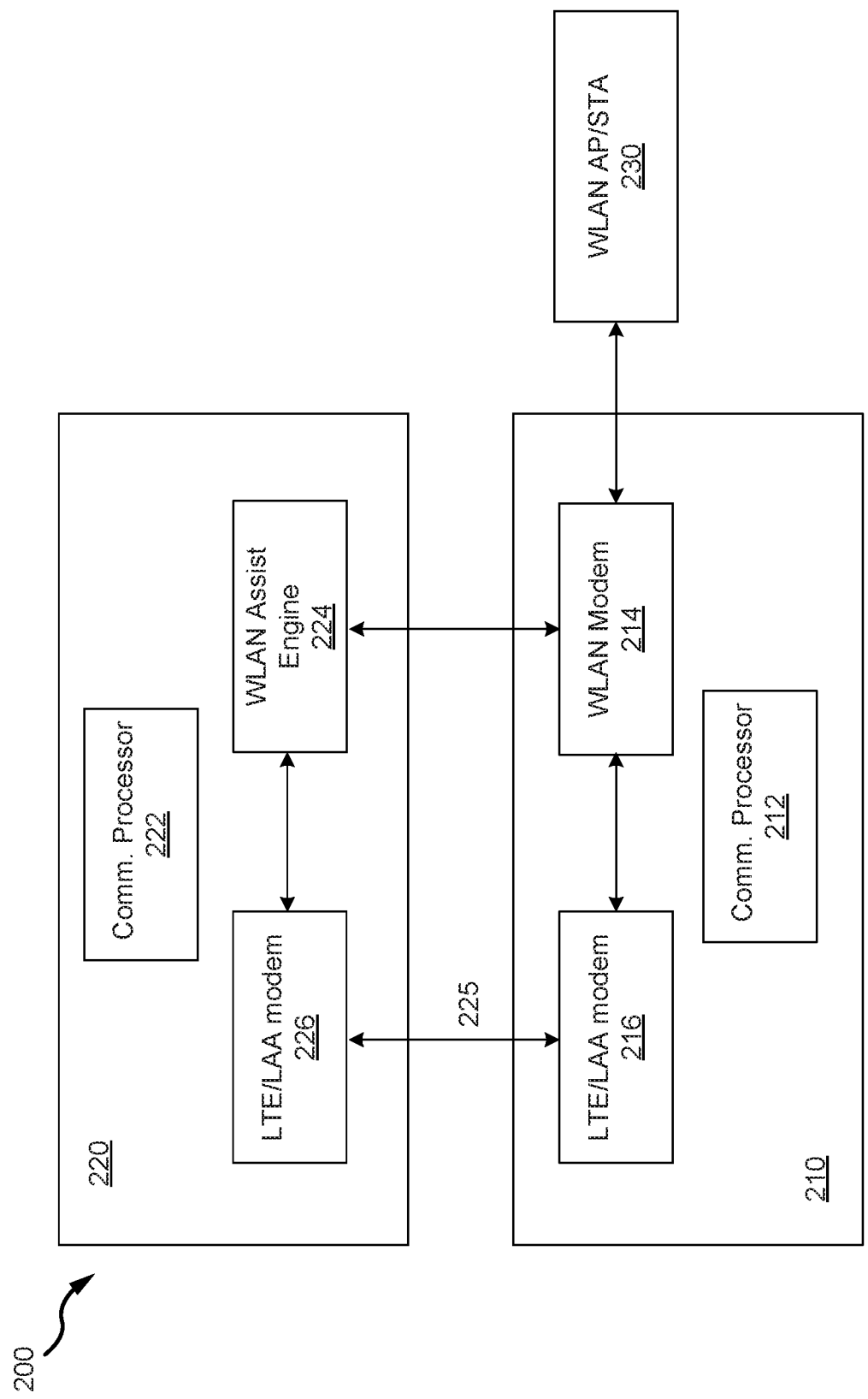
FIG. 2 illustrates an example of a communication system with cellular-WLAN coexistence in accordance with one or more implementations.

FIG. 2 illustrates an example of a communication system 200 with cellular-WLAN coexistence in accordance with one or more implementations. The communication system 200 includes a wireless device 210 and a base station 220. The wireless device 210 is an example implementation of the user device 110 of FIG. 1 and may be referred to as a station (STA) or a terminal device. The wireless device 210 may be, and/or may include, a mobile phone, a personal digital assistant (PDA), a tablet device, a computer, or generally any device that is operable to communicate wirelessly with one or more of the base station 220 and/or one or more of the access points (e.g., 130A-B of FIG. 1 or 230 of FIG. 2). The wireless device 210 includes, but is not limited to, a communication processor 212, a WLAN modem 214, and an LTE and/or LAA (LTE/LAA) modem 216. In one or more implementations, the communication processor 212 can be a dedicated processor, a micro controller, or a general processor of the wireless device 210 that is configured to perform specialized functionalities related to the subject technology. The WLAN modem 214 includes suitable logic, circuitry, interfaces, memory, and/or code that enable communications with a WLAN access point (AP) or station (STA) such as WLAN AP 230 or a base station (e.g., base station 220). The LTE/LAA modem 216 includes suitable logic, circuitry, interfaces, memory, and/or code that enable communications with a base station (e.g., 220). The LTE/LAA modem 216 may be an LTE modem, or may be a component of, an LTE modem that supports carrier aggregation between licensed and unlicensed bands using LAA.

The base station 220 is an example implementation of the base station 120A-B of FIG. 1, and can be an S cell. The base station 220 includes, but is not limited to, a communication processor 222, a WLAN assist engine 224, and an LTE/LAA modem 226. In one or more implementations, the communication processor 222 can be a dedicated processor, a micro controller, or a general processor of the base station 220 that is configured to perform specialized functionalities related to the subject technology. The WLAN assist engine 224 includes suitable logic, circuitry, interfaces, memory, and/or code that enable communications with a WLAN modem (e.g., 214) of a wireless device (e.g., 210). The LTE/LAA modem 226 includes suitable logic, circuitry, interfaces, memory, and/or code that enable communications with a wireless device (e.g., 210).

Because cellular networks are designed to provide almost complete coverage over a wide geographical area, a terminal device (e.g., 210) maintains, in most circumstances, almost continuous attachment (connection) to at least one cellular base station (e.g., an eNB such as 220). Handoff between these eNB (for example, as the user moves from one area to another) is managed by the cellular network based on signal quality measurements received from the terminal devices. The LWA and LWIP features work with WLAN access points (e.g., 230) to be deployed in the coverage area of certain base stations that support LWA/LWIP. The WLAN APs can operate at relatively low power (to be eligible for the use of unlicensed spectrum) and thus do not provide contiguous coverage over extended coverage areas. Further, LWA/LWIP are primarily of interest for deployment in certain areas where there are high capacity requirements (e.g. dense areas with many users where the aggregate demand for data traffic is high). Therefore, as terminal devices move from one area to another, they will pass in and out of areas where LWA/LWIP service is possible. Therefore, as terminal devices move into areas of LWA/LWIP coverage, there is a need for a mechanism whereby a terminal device can select a WLAN network which it can use with the LWA/LWIP feature. It is understood that terminal devices do not always use WLAN networks for the purpose of LWA/LWIP—indeed, most of the time, devices use WLAN networks standalone (e.g., without aggregation or integration with a cellular network) in order to access, for example, home and enterprise networks or public hotspot. The 3GPP LWA and LWIP standards specify a mechanism whereby an eNB that supports LWA/LWIP can provide a terminal device with a list of BSSIDs (e.g., unique identifiers of WLAN APs), signifying WLAN APs that provide (and/or are recommended to use with) the LWA/LWIP feature. The terminal device 210 then performs a WLAN channel scan to try to detect these APs, and sends the scan results for the eNB. On the basis of those results, the eNB may request the terminal device to associate (connect) to a specific WLAN AP (or a specific SSID/HESSID—signifying any one of a group of WLAN APs on the same network). Once the terminal device has associated with the AP and performed necessary authentication procedures, setup of LWA/LWIP aggregation of data traffic can begin.

In one or more implementations, the subject technology may facilitate LAA-WLAN coexistence. In LAA, a base station (e.g., a S cell such as 220) may use unlicensed spectrum in a carrier aggregation procedure. The unlicensed spectrum may be utilized for downlink transmissions and/or uplink transmissions (e.g., by the S cell 220). A user device (e.g., the wireless device 210) that supports the LAA feature may be able to operate both in licensed and unlicensed bands. In the case of the user device 210 that can be a multimode device that also supports WLAN, in-device coexistence issues may occur due to simultaneously supporting WLAN and LAA operations. In some cases, the simultaneous in-device operation of both WLAN and LTE/LAA modems 214 and 216 may introduce an additional type of interference (which may be referred to as receiver-receiver (Rx-Rx) interference) due at least in part to the WLAN and LTE/LAA modems 214 and 216 receiving data simultaneously when operating in adjacent channels.

The LTE/LAA downlink operation may be based on grants periodically provided by the base station 220, for example, at every 1 millisecond interval (e.g., subframe). The grant may indicate to the user device 210 if data is available in the current subframe as well as provide a method for obtaining the data if available. The LAA/LTE modem 216 is able to receive data at every subframe during periods of active LAA transmission. This receiving operation may result in Rx-Rx interference if the user device 210 receives WLAN signals on an adjacent channel at the same time as listening for the LAA grants. Such a receiving operation may also result in transmitter-receiver (Tx-Rx) interference if the user device 210 has to transmit WLAN signals at the same time as listening for the LAA grants.

The receiving operation may contribute to the WLAN modem 214 starvation. This is because the WLAN modem 214 may have to defer to the LTE/LAA modem 216 to listen to the channel at every subframe for a potential grant provided by the base station 220. However, generally, in real life deployment, it is unlikely that the user device 210 can be sent data at every subframe interval (e.g., every 1 millisecond). In cases where LAA and WLAN are operating on the same channel, LAA transmissions may utilize listen before talk (LBT) mechanisms to share the operating channel with other networks (e.g., including WLAN). This may create the opportunity for medium access time for the WLAN modem 214 if the WLAN modem 214 knows in advance that the medium is not going to be utilized for LTE/LAA communication.

In one or more implementations, the subject system provides manners and/or mechanisms by which the user device 210 may send reporting and/or measurements to an LAA cell, for example, an LAA small cell, such as 220. Such manners and/or mechanisms may allow the user device 210 to adjust its transmissions (e.g., channel, time, etc.) to reduce or minimize in-device coexistence issues. In one or more implementations, the subject system provides a framework whereby the WLAN modem 214 of the user device 210 may identify the time intervals during which the LTE-LAA modem 216 does not have to be engaged with (e.g., listen to) a medium.

In the communication system 200, measurement reports (or extension thereof) for LTE-Wi-Fi link aggregation (LWA) may be utilized in the context of LAA. LWA may allow and/or enable radio access network (RAN)-layer aggregation of LTE and WLAN links. In LWA, the communication processor 222 of the base station 220 may configure the user device 210 to report WLAN measurements (e.g., via WLAN modem 214) to activate LWA, deactivate LWA, and/or assist with WLAN mobility. The measurement reports may be referred to as user equipment (UE) reports. By way of a non-limiting example, the measurement configuration can include WLAN identifiers and channel information, and the UE report can include power measurements (e.g., Wi-Fi received signal strength indicator (RSSI) values). In some cases, if configured and can be acquired, the UE report may include other metrics such as STA count, admission capacity, backhaul rates, and channel utilization.

The mobility for LWA may allow flexibility to use WLAN mobility (e.g., STA driven) and LTE mobility (e.g., base station driven). The base station 220 may configure a WLAN mobility set in which the user device 210 can perform WLAN mobility without signaling to the base station 220. The WLAN mobility set may be in the form of a set of WLAN identifiers, such as a service set identifier (SSID), a homogenous extended service set identifier (HESSID), and/or a basic service set identifier (BSSID). If the user device 210 cannot find a suitable access point within the WLAN mobility set configured by the base station 220, the user device 210 may trigger an event (e.g., W3 event) and report a WLAN access point (e.g., 230) that the user device 210 can find WLAN access outside the WLAN mobility set configured by the base station 220. For instance, the access points within the WLAN mobility set may be associated with a WLAN RSSI that is less than a configured/predetermined threshold, whereas the WLAN outside of the mobility set may be associated with a WLAN RSSI greater than the threshold. In some aspects, the base station 220 can update the mobility set based on the information from the user device 210.

In some cases, WLAN signaling may be utilized to provide LAA time division multiplexing (TDM) information to the WLAN modem 214 of the user device 210. The LAA TDM information may be, may be a component of, and/or may be referred to as scheduling information. The base station 220 (e.g., a LTE small cell) may include features for facilitating in-device coexistence and use of LWA measurement reports. The message exchange may be performed through the respective LTE/LAA modems 226 and 216 of the base station 220 and the user device 210. The WLAN assist engine 224 of the base station 220 may provide WLAN capabilities (e.g., limited WLAN capabilities). The user device 210 may support an IDC signaling interface between the WLAN modem 214 and the LTE/LAA modem 226 via the LTE/LAA modem 216.

When the LTE-LAA modem 216 operates simultaneously with the WLAN modem 214, the user device 210 may signal, e.g. using in-device coexistence (IDC) signaling 225, the operating conditions of the user device 210 to the base station 220. A measurement event may be triggered in which a list of BSSIDs of neighboring access points (e.g., 230) are reported to the base station 220 together with channel information and the UE report including Wi-Fi RSSI. The measurement event may be denoted as a W4 event, which may be different from the events denoted as W1-W3 that trigger LWA measurements. In some cases, the measurement may be performed by the WLAN modem 214 and provided to the LTE/LAA modem 216.

Upon receiving the data from the user device 210, the base station 220 can determine a WLAN-friendly scheduling of the downlink/uplink data over the unlicensed spectrum. For example, in some cases where the user device 210 reports that it has an active WLAN connection, e.g., with WLAN AP 230), the base station may schedule (e.g., preferentially schedule) data transmissions on licensed spectrum (LTE), and therefore reduce/minimize data transmissions on unlicensed spectrum (LAA). Such scheduling may provide more opportunities for the user device 210 to use the WLAN modem 214 or WLAN radio. In some cases, the base station schedules data transmissions on unlicensed spectrum (LAA), but introduces intervals of silence using an access pattern provisioned in the LTE/LAA scheduler. The LTE/

LAA scheduler may use discontinuous reception (DRX), or other scheduling technique(s), for downlink (DL) data to the user device 210. The downlink pattern chosen by the base station 220 or P cell scheduler for the unlicensed access may be communicated to the user device 210 through an access network query protocol (ANQP) and/or probe-based query/response procedure over the WLAN access between the WLAN assist engine 224 of the base station 220 and the WLAN modem 214 of the user device 210. In some cases, such communication can be through WLAN signaling (e.g., rather than LTE-LAA signaling). The procedure can be initiated by the user device 210 at the start of the IDC procedure or at each moment when coexistence related events are noticeable on the user device 210. The downlink pattern information reported over this mechanism may include, for example, the start and/or stop times of future scheduled transmission to the user device 210, parameters of a persistent duty cycle for scheduled transmissions to the user device 210, and/or parameters for future scheduling of uplink grants for the user device (e.g., in the case where LAA uplink transmission is supported).

Once the user device 210 has received information on the TDM scheduling of LAA transmissions by the user device from the base station 220, the user device 210 may utilize the information in various ways. In a case that the WLAN modem 214 of the user device 210 is associated with a WLAN AP (e.g., WLAN AP/STA 230), the user device 210 may send an unscheduled automatic power save delivery (UAPSD or U-APSD) power save (or U-APSD coexistence) signaling to the WLAN AP to inform the WLAN AP of the periods during which the user device 210 may be unable to receive WLAN signals (e.g., since LAA transmissions are scheduled). The WLAN AP 230 may then avoid transmitting to the user device 210 during those periods.

If the user device 210 determines that, given the base station's planned LAA scheduling, the user device 210 is unable to sustain a WLAN link (e.g., sustain a WLAN link of sufficiently high quality), the user device 210 can signal to the WLAN AP 230 its coexistence issue (e.g., using a beacon report). The WLAN AP 230 may steer (e.g., attempt to steer) the user device 210 to another BSS (e.g., channel or band) with less coexistence interference, and/or the WLAN AP 230 may change its own operating channel. In other cases, the user device 210 may scan for alternative WLAN BSS that provide the same or similar network service but operate on another band/channel with less coexistence interference and/or expected WLAN performance key performance indicators (KPIs) are improved based on the user device 210's measurements and/or metrics provided by the WLAN AP 230 (e.g., channel utilization, estimated service parameters).

In a case that the WLAN modem 214 of the user device 210 is itself operating as an AP (e.g., as a soft AP for cellular tethering, Wi-Fi Direct GO, etc.), the WLAN modem 214 may choose an alternative operating channel/band to reduce or minimize coexistence interference, avoid (e.g., to the extent possible) transmitting WLAN signals at the same time the user device 210 is receiving LAA grants or other signals, for example, by buffering DL traffic to be sent to other WLAN devices (Tx-Rx interference), and/or using WLAN mechanisms where available (e.g., IEEE 802.11ax multi-user (MU) trigger frames) to avoid receiving uplink signals at the same time as receiving LAA grants or data traffic (Rx-Rx interference).

In a case that the user device 210 shares a radio frequency (RF) front-end between the LAA and WLAN modems that switches the RF chain between two separate basebands, the information on the TDM scheduling of LAA transmissions may be utilized to determine the timing of the switch. For example, since the user device 210 may know when an LAA scheduled transmission will finish, the user device 210 can switch (e.g., immediately switch) to the WLAN interface to facilitate transmitting/receiving WLAN signals. The fast switching may be utilized in the case that the LAA and WLAN modems 216 and 214 are operating on the same channel. This can happen when the user device 210 has to perform LBT to gain channel access to transmit as soon as the base station 220 (e.g., LAA base station) has finished transmitting on the same channel.

Figure 3:
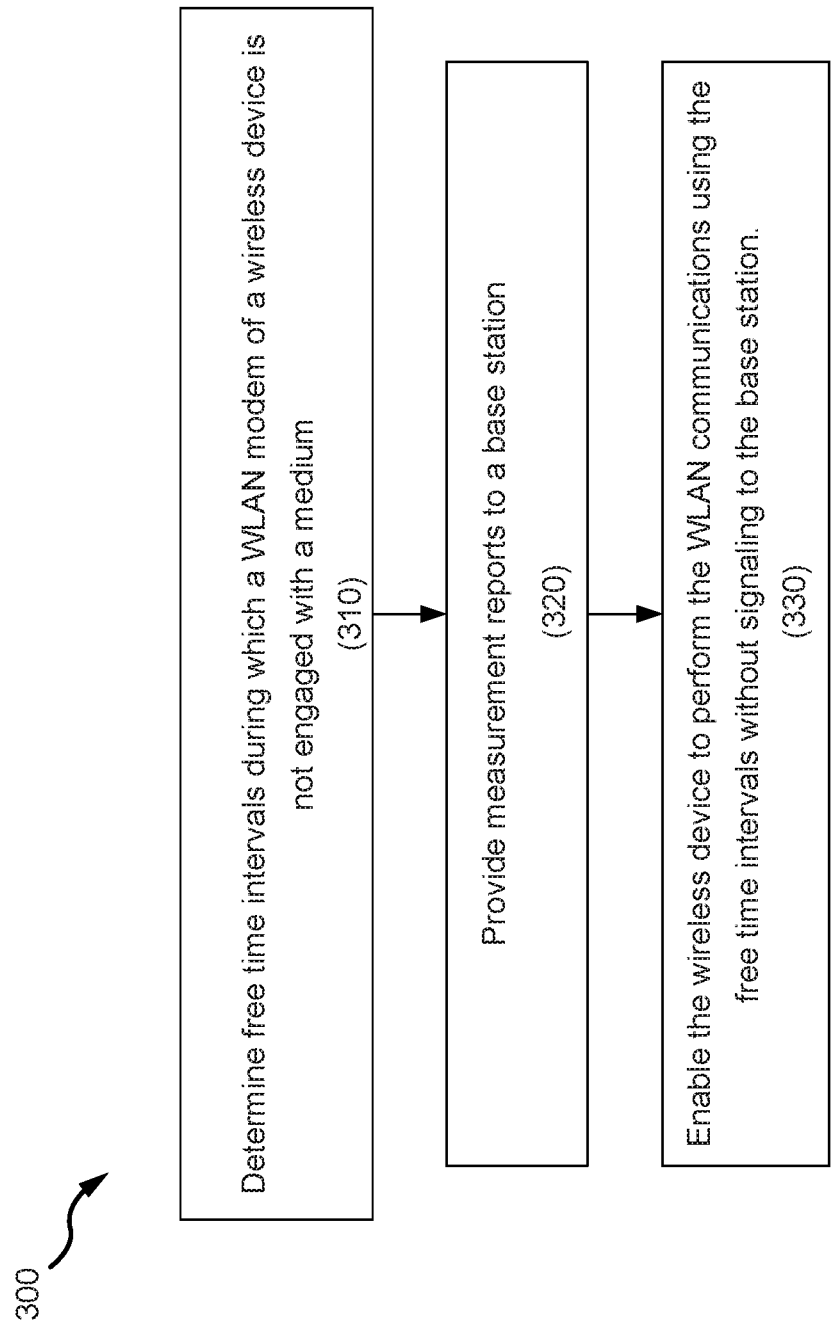
FIG. 3 illustrates an example of a method of providing cellular-WLAN coexistence in a wireless device in accordance with one or more implementations.

FIG. 3 illustrates an example of a method 300 of providing cellular-WLAN coexistence in a wireless device in accordance with one or more implementations. The method starts at operation block 310, where free time intervals during which the second modem circuit (e.g., 216 of FIG. 2) is not engaged with a medium are determined by a communication processor (e.g., 212 of FIG. 2). The wireless device (e.g., 210 of FIG. 2) can provide measurement reports to a base station (e.g., 220 of FIG. 2) (320). The first modem circuit (e.g., 214 of FIG. 2) can enable the wireless device to perform the WLAN communications using the free time intervals without signaling to the base station.

Figure 4:
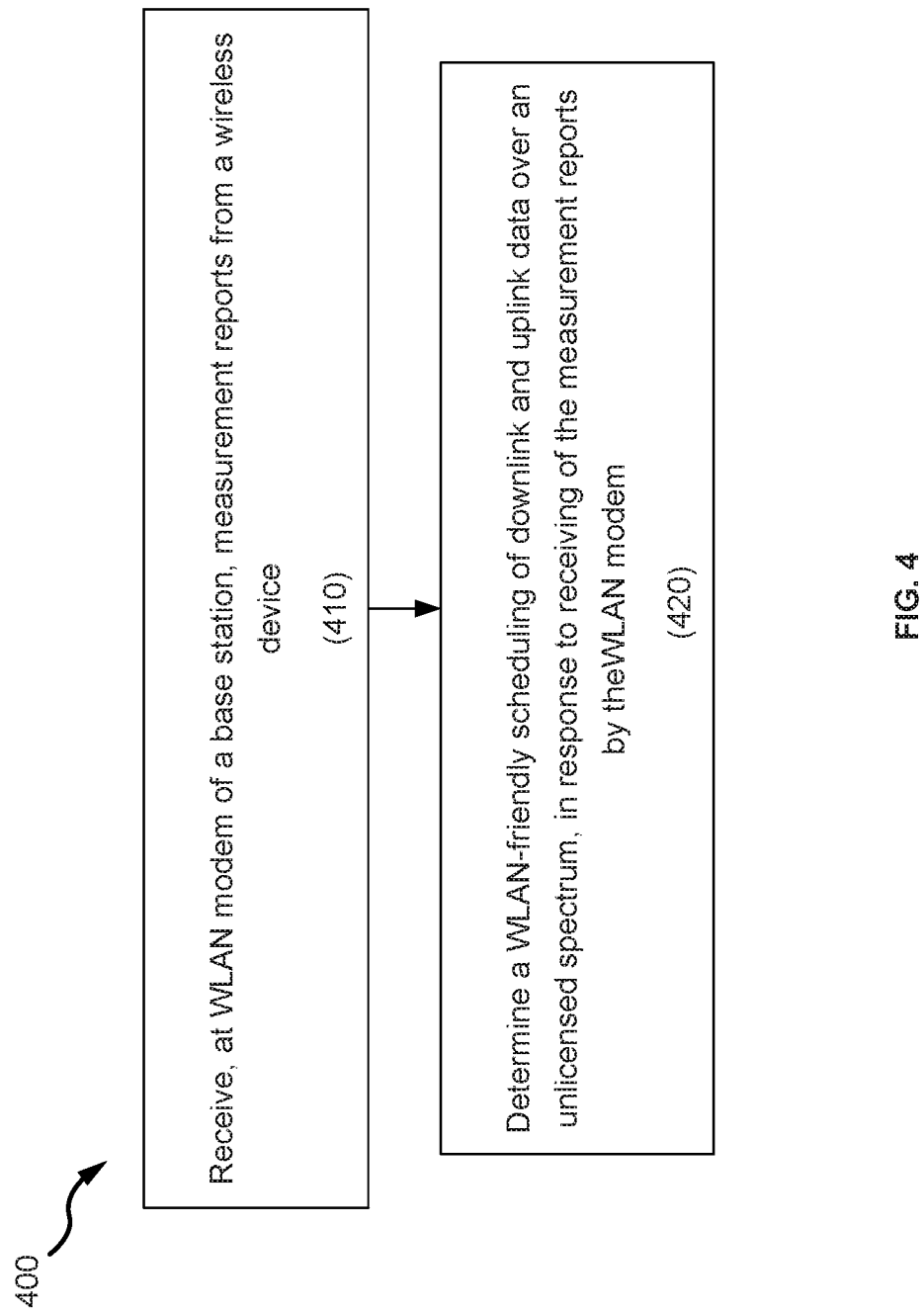
FIG. 4 illustrates an example of a method of providing cellular-WLAN coexistence in a base station in accordance with one or more implementations.

FIG. 4 illustrates an example of a method 400 of providing cellular-WLAN coexistence in a base station in accordance with one or more implementations. The method 400 starts by receiving measurement reports by the wireless modem (e.g., 224 of FIG. 2) from a wireless device (e.g., 210 of FIG. 2) (410). In response to receiving the measurement reports, the communication processor circuit (e.g., 222 of FIG. 2) determines a WLAN-friendly scheduling of downlink and uplink data over an unlicensed spectrum.

Figure 5:
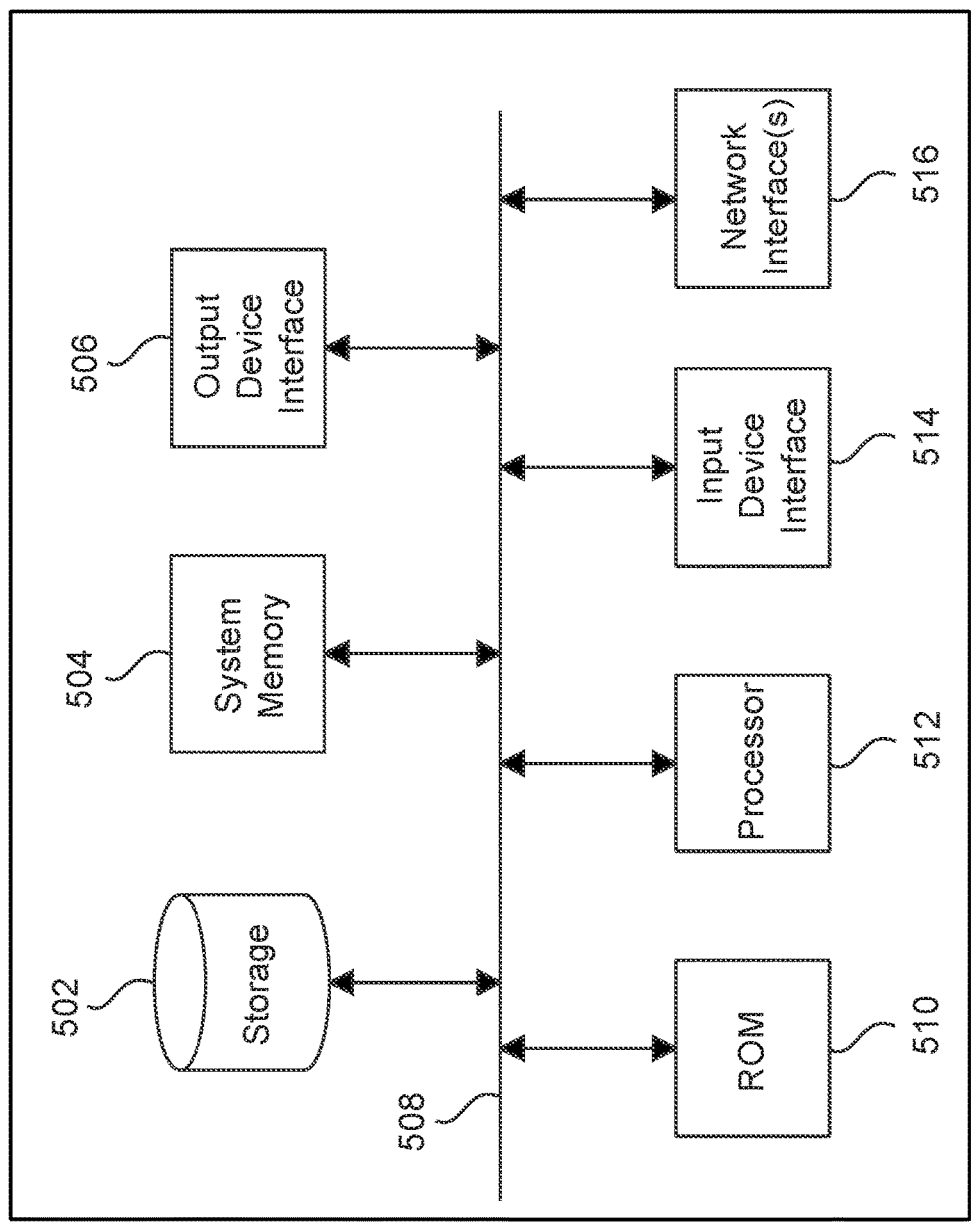
FIG. 5 conceptually illustrates an electronic system with the subject technology is implemented.

FIG. 5 conceptually illustrates an electronic system 500 with the subject technology is implemented. The electronic system 500, for example, can be a network device, a media converter, a desktop computer, a laptop computer, a tablet computer, a server, a switch, a router, a base station, a receiver, a phone, or generally any electronic device that transmits signals over a network. Such an electronic system 500 includes various types of computer readable media and interfaces for various other types of computer readable media. In one or more implementations, the electronic system 500 can be, and/or can be a part of, one or more of the user device 110, base stations 120A-B, and/or access points 130A-B. The electronic system 500 includes a bus 508, one or more processing unit(s) 512, a system memory 504, a read-only memory (ROM) 510, a permanent storage device 502, an input device interface 514, an output device interface 506, and a network interface 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system. The permanent storage device 502, on the other hand, is a read-and-write memory device. The permanent storage device 502 is a non-volatile memory unit that stores instructions and data even when the electronic system 500 is off. One or more implementations of the subject disclosure use a mass storage device (such as a magnetic or optical disk and its corresponding disk drive) as the permanent storage device 502.

Other implementations use a removable storage device (such as a floppy disk, flash drive, and its corresponding disk drive) as the permanent storage device 502. Like the permanent storage device 502, the system memory 504 is a read-and-write memory device. However, unlike the permanent storage device 502, the system memory 504 is a volatile read-and-write memory, such as random access memory. System memory 504 stores any of the instructions and data that the one or more processing unit(s) 512 needs at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations. In one or more implementations, the one or more processing unit(s) 512 may perform the functionalities of the communication processors 212 and 222 of FIG. 2.

The bus 508 also connects to the input device interface 514 and the output device interface 506. The input device interface 514 enables a user to communicate information and select commands to the electronic system. Input devices used with the input device interface 514 include, for example, alphanumeric keyboards and pointing devices (also called "cursor control devices"). The output device interface 506 enables, for example, the display of images generated by the electronic system 500. Output devices used with the output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks (not shown) through one or more network interfaces 516. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, eTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Figure 6:
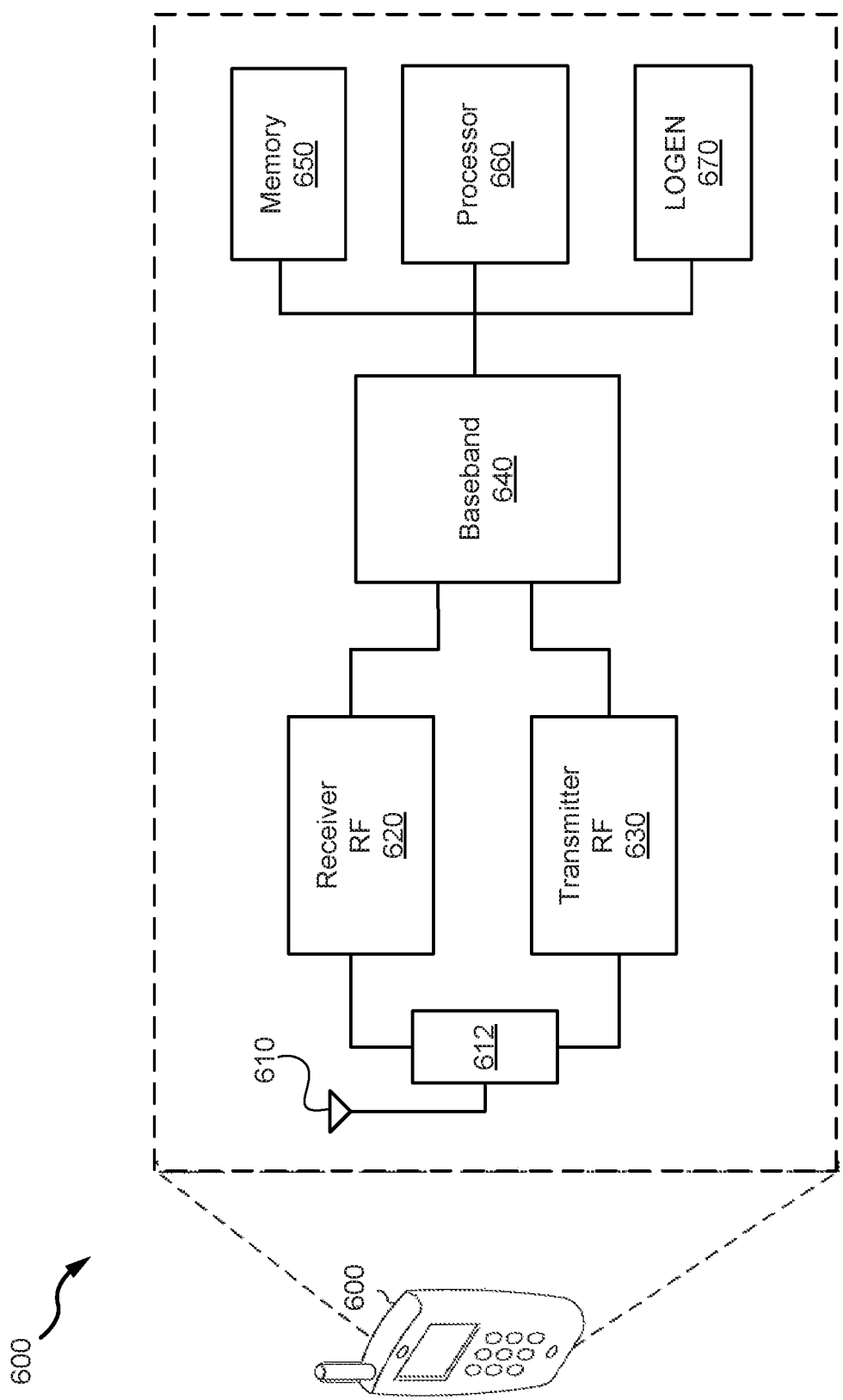
FIG. 6 conceptually illustrates a communication device in which the subject technology can be implemented.

FIG. 6 conceptually illustrates an example wireless communication device 600 in which the subject technology can be implemented. The wireless communication device 600 may represent the wireless device 210 of FIG. 2. The wireless communication device 600 may comprise a radio-frequency (RF) antenna 610, a receiver 620, a transmitter 630, a baseband processing module 640, a memory 650, a processor 660, and a local oscillator generator (LOGEN) 670. In various embodiments of the subject technology, one or more of the blocks represented in FIG. 6 may be integrated on one or more semiconductor substrates. For example, the blocks 620-670 may be realized in a single chip or a single system on chip, or may be realized in a multi-chip chipset.

The RF antenna 610 may be suitable for transmitting and/or receiving RF signals (e.g., wireless signals) over a wide range of frequencies. Although a single RF antenna 610 is illustrated, the subject technology is not so limited.

The receiver 620 may comprise suitable logic circuitry and/or code that may be operable to receive and process signals from the RF antenna 610. The receiver 620 may, for example, be operable to amplify and/or down-covert received wireless signals. In various embodiments of the subject technology, the receiver 620 may be operable to cancel noise in received signals and may be linear over a wide range of frequencies. In this manner, the receiver 620 may be suitable for receiving signals in accordance with a variety of wireless standards. Wi-Fi, WiMAX, Bluetooth, and various cellular standards such as LTE and LAA standards and be able to support cellular-WLAN coexistence as described above with respect to FIG. 2. In various embodiments of the subject technology, the receiver 620 may not require any SAW filters and few or no off-chip discrete components such as large capacitors and inductors.

The transmitter 630 may comprise suitable logic circuitry and/or code that may be operable to process and transmit signals from the RF antenna 610. The transmitter 630 may, for example, be operable to up-covert baseband signals to RF signals and amplify RF signals. In various embodiments of the subject technology, the transmitter 630 may be operable to up-convert and amplify baseband signals processed in accordance with a variety of wireless standards. Examples of such standards may include Wi-Fi, WiMAX, Bluetooth, and various cellular standards various cellular standards such as LTE and LAA standards. In various embodiments of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receive band. The duplexer may be operable in multiple frequency bands of various wireless standards.

The baseband processing module 640 may comprise suitable logic, circuitry, interfaces, and/or code that may be operable to perform processing of baseband signals. The baseband processing module 640 may, for example, analyze received signals and generate control and/or feedback signals for configuring various components of the wireless communication device 600 such as the receiver 620. The baseband processing module 640 may be operable to encode, decode, transcode, modulate, demodulate, encrypt, decrypt, scramble, descramble, and/or otherwise process data in accordance with one or more wireless standards. In some embodiments, the baseband processing module 640 may perform at least partially the functionalities of the communication processor 222 of FIG. 2.

The processor 660 may comprise suitable logic, circuitry, and/or code that may enable processing data and/or controlling operations of the wireless communication device 600. In this regard, the processor 660 may be enabled to provide control signals to various other portions of the wireless communication device 600. The processor 660 may also control transfers of data between various portions of the wireless communication device 600. Additionally, the processor 660 may enable implementation of an operating system or otherwise execute code to manage operations of the wireless communication device 600. In some embodiments, the processor 660 may perform at least partially the functionalities of the communication processor 222 of FIG. 2.

The memory 650 may comprise suitable logic, circuitry, and/or code that may enable storage of various types of information such as received data, generated data, code, and/or configuration information. The memory 650 may comprise, for example, RAM, ROM, flash, and/or magnetic storage. In various embodiment of the subject technology, Information stored in the memory 650 may be utilized for configuring the receiver 620 and/or the baseband processing module 640.

The local oscillator generator (LOGEN) 670 may comprise suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

In operation, the processor 660 may configure the various components of the wireless communication device 600 based on a wireless standard according to which it is desired to receive signals. Wireless signals may be received via the RF antenna 610 and amplified and down-converted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 650, and/or information affecting and/or enabling operation of the wireless communication device 600. The baseband processing module 640 may modulate, encode and perform other processing on audio, video, and/or control signals to be transmitted by the transmitter 630 in accordance to various wireless standards.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A wireless device, comprising:
a first modem circuit configured to support wireless local area network (WLAN) communications;
a second modem circuit configured to support long term evolution (LTE) and licensed assisted access (LAA) communications; and
at least one processor circuit configured to determine free time intervals during which the second modem circuit is not engaged with a medium,
wherein:
the wireless device is configured to provide measurement reports to a base station,
the first modem circuit is configured to enable the wireless device to perform the WLAN communications using the free time intervals without signaling to the base station, and
the first modem circuit is configured to inform a WLAN access point of time intervals during which the wireless device is unable to receive WLAN signals based on a time-division multiplexing (TDM) scheduling of LAA transmissions received from the base station.

2. The wireless device of claim 1, wherein a WLAN mobility set of the wireless device is configured by the base station and comprises a set of WLAN identifiers including at least one of a service set identifier (SSID), a homogenous extended service set identifier (HESSID), or basic service set identifier (BSSID).

3. The wireless device of claim 2, wherein received signal strength indicator (RSSI) of signals receivable by the wireless device from access point devices corresponding to the WLAN mobility set are lower than a predetermined threshold.

4. The wireless device of claim 3, wherein the second modem circuit is configured to receive WLAN signaling from the base station, wherein the WLAN signaling includes scheduling information including information related to LAA time-division-multiplexing (TDM).

5. The wireless device of claim 4, wherein the first modem circuit and the second modem circuit are operating simultaneously, and wherein the second modem circuit is configured to report wireless device conditions to the base station when the first modem circuit and the second modem circuit are operating simultaneously.

6. The wireless device of claim 3, wherein the first modem circuit is configured to report measurement reports, including information on a measured RSSI higher than the predetermined threshold associated with another access point device not corresponding to the WLAN mobility set, to the base station.

7. The wireless device of claim 1, wherein the measurement reports comprise a list of BSSIDs associated with neighboring access points, channel information, and Wi-Fi RSSI values.

8. The wireless device of claim 7, wherein a measurement event comprises a W4 event, and wherein a respective measurement is performed by the first modem circuit.

9. The wireless device of claim 1, wherein the first modem circuit is configured to inform the WLAN access point that the wireless device is unable to sustain a WLAN communication, based on a TDM scheduling of the LAA transmissions.

10. The wireless device of claim 9, wherein the first modem circuit is configured to inform the WLAN access point that the wireless device is unable to sustain a WLAN communication, based on a TDM scheduling of the LAA transmissions, and to scan for another WLAN access point that can provide access over a link with less coexistence interference or better performance, and wherein the link comprises a communication channel or a communication band.

11. The wireless device of claim 1, further comprising a shared RF front-end circuit switchable by a switch between the first modem circuit and the second modem circuit, and wherein the switch is controlled based on a TDM scheduling of LAA transmissions.

12. A wireless cell comprising:
a first modem configured to assist in wireless local area network (WLAN) communications including receiving measurement reports from a wireless device;
a second modem configured to support a cellular long term evolution (LTE) communication and a licensed assisted access (LAA) communication and to receive, via the IDC signaling, operating conditions of the wireless devise including information that the wireless device has an active connection WLAN connection; and
at least one processor circuit configured to:
determine free time intervals of the second modem for a scheduling of downlink and uplink data over an unlicensed spectrum, in response to receiving of the measurement reports by the first modem; and
schedule data transmissions on unlicensed spectrum through the LAA communications while introducing intervals of silence using a provisioned access pattern.

13. The wireless cell of claim 12, wherein the wireless device comprises a terminal device, and wherein the second modem is configured to handle in-device coexistence (IDC) signaling with the terminal device.

14. The wireless cell of claim 12, wherein the operating conditions includes information that the wireless device has an active connection WLAN connection, and wherein the at least one processor circuit is configured to schedule data transmission on licensed spectrum through LTE communication.

15. The wireless cell of claim 12, wherein the first modem is configured to communicate to a wireless device a downlink pattern associated with the LAA communication through at least one of an access network query protocol (ANQP) or a probe-based query-response procedure.

16. The wireless cell of claim 12, wherein the measurement reports comprises a list of BSSIDs associated with neighboring access points, channel information, and Wi-Fi RSSI value.

17. The wireless cell of claim 12, wherein the scheduling is based on the measurement reports and comprises a scheduling of downlink and uplink data over the unlicensed spectrum that can coexist with WLAN communication with the wireless device.

18. A wireless communication system comprising:
a wireless device comprising a first modem, a second modem, and a first communication processor; and
a base station comprising a third modem, a fourth modem, and a second communication processor,
wherein:
the first modem is configured to support wireless local area network (WLAN) communications,
the second modem is configured to support a long term evolution (LTE) communication and a licensed assisted access (LAA) communication, and to receive, via the IDC signaling, operating conditions of the wireless devise including information that the wireless device has an active connection WLAN connection,
the first communication processor is configured to determine time intervals during which the second modem is not listening to a medium,
the wireless device is configured to provide measurement reports to the base station,
the first modem is configured to enable the wireless device to perform the WLAN communications using the time intervals,
the third modem is configured to assist in WLAN communications including receiving the measurement reports from the wireless device,
the fourth modem is configured to support the LTE communication and the LAA communication, and
the second communication processor is configured to:
determine free time intervals of the second modem for a scheduling of downlink and uplink data over an unlicensed spectrum, in response to receiving of the measurement reports by the first modem; and
schedule data transmissions on unlicensed spectrum through the LAA communications while introducing intervals of silence using a provisioned access pattern.

19. The wireless communication system of claim 18, wherein the measurement reports comprises a list of BSSIDs associated with neighboring access points, channel information, and a Wi-Fi RSSI.

20. The wireless device of claim 18, wherein the scheduling is based on the measurement reports and comprises a scheduling of the downlink and uplink data over the unlicensed spectrum that can coexist with WLAN communication with the wireless device.

* * * * *